(12) United States Patent
Baggenstoss

(10) Patent No.: US 6,535,641 B1
(45) Date of Patent: Mar. 18, 2003

(54) CLASS SPECIFIC CLASSIFIER

(75) Inventor: Paul M. Baggenstoss, Newport, RI (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/431,716

(22) Filed: Oct. 28, 1999

(51) Int. Cl.$^7$ ................................................ G06K 9/62
(52) U.S. Cl. ..................................................... 382/228
(58) Field of Search ................................. 382/228, 224, 382/225, 226, 227, 156, 159, 160; 706/20

(56) References Cited

U.S. PATENT DOCUMENTS

| | | | | |
|---|---|---|---|---|
| 5,054,093 A | * | 10/1991 | Cooper et al. | 382/159 |
| 5,361,379 A | * | 11/1994 | White | 340/937 |
| 5,511,009 A | * | 4/1996 | Pastor | 702/190 |
| 5,724,487 A | * | 3/1998 | Streit | 706/25 |
| 5,754,681 A | * | 5/1998 | Watanabe et al. | 382/159 |
| 5,832,108 A | * | 11/1998 | Fukita et al. | 382/155 |
| 5,950,180 A | * | 9/1999 | Wagner et al. | 706/14 |

OTHER PUBLICATIONS

Giannakis et al. "Signal Detection and Classification Using Matched Filtering and Higher Order Statistics." IEEE Trans. on Acoustics, Speech, and Signal Processing, vol.38, No. 7, Jul. 1990, pp. 1284–1296.*

Yu et al. "A Feature Selection Method for Multi–Class–Set Classification." Int. Joint Conf. on Neural Networks, IJCNN, vol.3, Jun. 1992, pp.567–572.*

Kim et al. "Generalized Probabilistic Neural Network Based Classifiers." Int. Joint Conf. on Neural Networks, IJCNN, vol.3, Jun. 1992, pp.648–653.*

Watanabe et al. "Discriminative Metric Design for Robust Pattern Recognition." IEEE Trans. on Signal Processing, vol.45, No. 11, Nov. 1997, pp.2655–2662.*

Baggenstoss. "Class –Specific Feature Sets in Classification." Proc. of IEEE Int. Symp. on Intelligent Control (ISIC), Sep. 14, 1998, pp.413–416.*

Baggenstoss et al. "An E–M Algorithm for Joint Model Estimation." Proc. of IEEE Int. Conf. on Acoustics, Speech and Signal Processing, vol.4, Mar. 15, 1999, pp.1825–1828.*

* cited by examiner

Primary Examiner—Jon Chang
(74) Attorney, Agent, or Firm—Michael J. McGowan; James M. Kasischke; Michael F. Oglo

(57) ABSTRACT

Accordingly there is provided a class specific classifier for classifying data received from a data source. The classifier has a feature transformation section associated with each class of data which receives the data and provides a feature set for the associated data class. Each feature transformation section is joined to a pattern matching processor which receives the associated data class feature set. The pattern matching processors calculate likelihood functions for the associated data class. One normalization processor is joined in parallel with each pattern matching processor for calculating an inverse likelihood function from the data, the associated class feature set and a common data class set. The common data class set can be either calculated in a common data class calculator or incorporated in the normalization calculation. The inverse likelihood function is then multiplied with the likelihood function for each associated data class. A comparator provides a signal indicating the appropriate class for the input data based upon the highest multiplied result.

14 Claims, 2 Drawing Sheets

CLASS SPECIFIC CLASSIFIER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

This invention generally relates to a signal classification system for classifying an incoming data stream. More particularly, the invention relates to an improvement to the M-ary classifier known in the prior art resulting in a higher probability of correct classification.

(2) Description of the Prior Art

In order to determine the nature of an incoming signal, the signal type must be determined. A classifier attempts to classify a signal into one of M signal classes based on features in the data. M-ary classifiers utilize neural networks for extracting these features from the data. In a training stage the neural networks incorporated in the classifier are trained with labeled data allowing the neural networks to learn the patterns associated with each of the M classes. In a testing stage, the classifier is tested against unlabeled data based on the learned patterns. The performance of the classifier is defined as the probability that a signal is correctly classified, herein referred to as "PCC".

A prior art classifier is shown in FIG. 1. The classifier 2 receives data from a data source 4. Data source 4 is joined to a feature transformation module 6 for developing a feature set. The feature set is provided to pattern match processors 8 which correspond to each data class. Pattern match processors 8 provide an output measuring the developed feature set against trained data. The pattern match processor 8 outputs are compared in a comparison 9 and the highest output is selected.

The basis of most M-ary classifiers is the maximum aposteriori probability (MAP) classifier or Bayesian classifier $$\arg \max_{j=1}^{M} p(H_j \mid X) = \arg \max_{j=1}^{M} p(X \mid H_j) p(H_j). \tag{1}$$

However, if the likelihood functions $p(X|H_j)$ are not known, it is necessary to estimate them from training data. Dimensionality dictates that this is impractical or impossible unless X is reduced to a smaller set of statistics, or features $Z=T(X)$.

While many methods exist for choosing the features, this invention concentrates on class-specific strategies. Class specific architectures are taught in the prior art in patents such as Watanabe et al., U.S. Pat. No. 5,754,681.

One possible class-specific strategy is to identify a set of statistics $z_j$, corresponding to each class $H_j$, that is sufficient or approximately sufficient to estimate the unknown state of the class. Sufficiency in this context will be defined more precisely in the theorem that follows. Because some classes may be similar to each other, it is possible that the M feature sets are not all distinct. Let $$Z = \bigcup_{i=1}^{M} z_i \tag{2}$$

where set union notation is used to indicate that there are no redundant or duplicate features in Z. However, removing redundant or duplicate features is not restrictive enough. A more restrictive, but necessary requirement is that $p(Z|H_j)$ exists for all j. The classifier based on Z becomes $$\arg \max_{j=1}^{M} p(Z \mid H_j) p(H_j). \tag{3}$$

The object of the feature selection process is that (3) is equivalent to (1). Thus, they are sufficient for the problem at hand.

In spite of the fact that the feature sets $z_j$ are chosen in a class-specific manner and are possibly each of low dimension, implementation of (3) requires that the features be grouped together into a super-set Z. Dimensionality issues dictate that Z must be of low dimension (less than about 5 or 6) so that a good estimate of $p(Z|H_j)$ may be obtained with a reasonable amount of training data and effort. The complexity of the high dimensional space is such that it becomes impossible to estimate the probability density function (PDF) with a reasonable amount of training data and computational burden. In complex problems, Z may need to contain as many as a hundred features to retain all necessary information. This dimensionality is entirely unmanageable. It is recognized by a number of researchers that attempting to estimate PDF's nonparametrically above five dimensions is difficult and above twenty dimensions is futile. Dimensionality reduction is the subject of much research currently and over the past decades. Various approaches include feature selection, projection pursuit, and independence grouping. Several other methods are based on projection of the feature vectors onto lower dimensional subspaces. A significant improvement on this is the subspace method in which the assumption is less strict in that each class may occupy a different subspace. Improvements on this allow optimization of error performance directly.

All these methods involve various approximations. In feature selection, the approximation is that most of the information concerning all data classes is contained in a few of the features. In projection-based methods, the assumption is that information is confined to linear subspaces. A simple example that illustrates a situation where this assumption fails is when the classes are distributed in a 3-dimensional volume and arranged in concentric spheres. The classes are not separated when projected on any 1 or 2-dimensional linear subspace. However, statistics based on the radius of the data samples would constitute a simple 1-dimensional space in which the data is perfectly separated.

Whatever approach one uses, if Z has a large dimension, and no low-dimensional linear or nonlinear function of the data can be found in which most of the useful information lies, either much of the useful information must be discarded in an attempt to reduce the dimension or a crude PDF estimate in the high-dimensional space must be obtained. In either case, poor performance may result.

SUMMARY OF THE INVENTION

Therefore, it is one purpose of this invention to provide an improvement on the M-ary classifier.

Another purpose of this invention is to drastically reduce the maximum PDF dimension while at the same time retaining theoretical equivalence to the classifier constructed from the full feature set and to the optimum MAP classifier.

Yet another purpose is to provide a classifier that gives this performance using a priori information concerning data and classes that is discarded when the combined feature set is created.

Accordingly there is provided a class specific classifier for classifying data received from a data source. The classifier has a feature transformation section associated with each class of data which receives the data and provides a feature set for the associated data class. Each feature transformation section is joined to a pattern matching processor which receives the associated data class feature set. The pattern matching processors calculate likelihood functions for the associated data class. One normalization processor is joined in parallel with each pattern matching processor for calculating an inverse likelihood function from the data, the associated class feature set and a common data class set. The common data class set can be either calculated in a common data class calculator or incorporated in the normalization calculation. Preferably, the common data class set will be calculated before processing the received data. The inverse likelihood function is then multiplied with the likelihood function for each associated data class. A comparator provides a signal indicating the appropriate class for the input data based upon the highest multiplied result. The invention may be implemented either as a device or a method operating on a computer.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF THE PREFERRED EMBODIMENT

Figure 1:
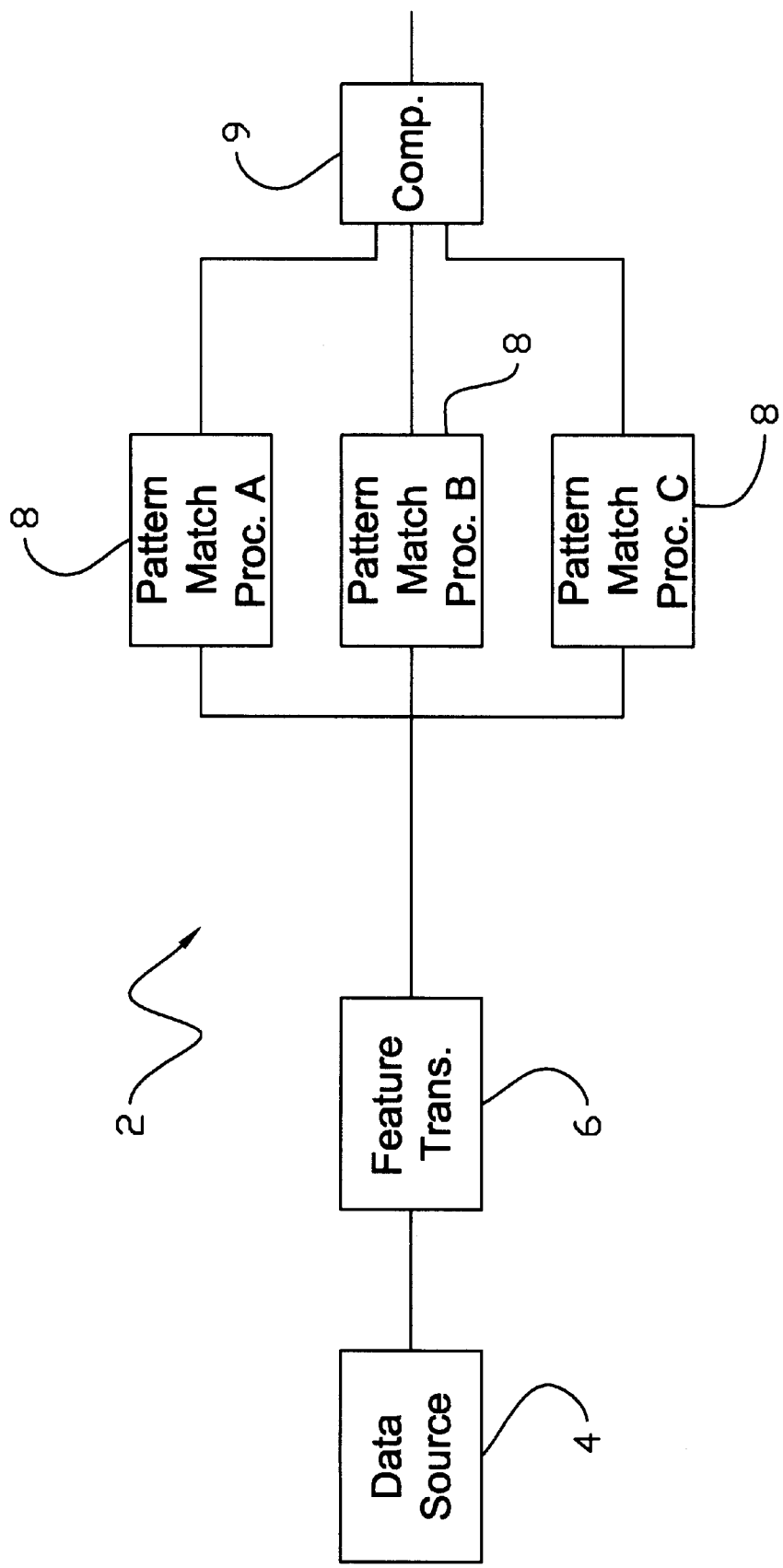
FIG. 1 is a block diagram of a standard classifier well known in the prior art.

Formulating this invention requires two fundamental ideas. The first idea involves defining some common class $H_0$ which is a subset of all classes. This is possible if all classes have random amplitudes and are embedded in additive noise. Then if $H_0$ is the noise-only class, $$H_0 \in H_j, j=1, 2, \ldots, M. \tag{4}$$

The next idea is to connect the selection of $z_j$ with the idea of sufficiency. This is done by assuming M distinct probability density function (PDF) families $p(X|H_j)$, $j=1, 2, \ldots, M$ where $H_j$ are the class hypotheses. For each class j, $p(X|H_j)$ is parameterized by a random parameter set $\theta_j$, thus $$p(X \mid H_j) = \int_{\theta_j} p(X \mid \theta_j) p(\theta_j) d\theta_j \tag{5}$$

for all j. For each class j, there is also a sufficient statistic for $\theta_j$, $z_j = T_j(X)$, and a combined feature set $Z = T(X)$ such that $z_j \in Z$, $j=1, 2, \ldots, M$. The PDF, $p(Z|H_j)$, must exist for all j, and the span of $\theta_j$ must include a point $\theta_j^o$ that results in an equivalent distribution for X regardless of j:

$$p(X|H_j, \theta_j^o) = p(X|H_0), j=1, \ldots, M \tag{6}$$

Then, the MAP classifier (1) may be expressed as $$\arg\max_j \frac{p(z_j \mid H_j)}{p(z_j \mid H_0)} p(H_j). \tag{7}$$

Accordingly, it is possible to reduce the dimensionality, yet end up with a classifier theoretically equivalent to the MAP classifier based on the full-dimensional feature set. It is noted by S. Kay in "Sufficiency, classification, and the class specific feature theorem," Submitted to IEEE Trans. ASSP, June 1998, that under the same assumptions necessary for the above, (7) is equivalent to (1), thus (7) is fully equivalent to the MAP classifier based on the training data. While the reduction of the high-dimensional problem to a low-dimensional problem is significant enough, another significant idea emerges revolving around the idea of sufficiency. If $\{Z_j\}$ are sufficient (in the Neyman-Fisher sense) for the parameterizations of the corresponding class, and a common class $H_0$ can be found, then Z is sufficient for the classification problem at hand. It is also important to note that while the parameter distributions $p(\theta_j|H_j)$ are used above, they are not required in practice. All that is required are estimates of the low-dimensional PDF's $p(z_j|H_j)$ Equation (7) can be implemented in a detector/classifier architecture wherein each term in the maximization corresponds to a distinct and independent processing branch. The output of each branch is a detection statistic for distinguishing the corresponding signal class from $H_0$. The modularity of the processor has obvious advantages. As long as the same $H_0$ is used, each branch can be independently designed, trained, and implemented by separate computational hardware. As new signal classes are added to the classifier, it only means adding new branches to the structure. Existing branches remain unchanged. As a generalization of the idea of the Generalized Likelihood Ratio Test, there may be a variety of subclasses indexed by a parameter $\theta$. It is possible to carry out a maximization over $\theta$ prior to normalization by $p(z_j|H_0)$. The common class $H_0$ does not need to be a real class. Technically, the only requirement is that the parameter sets of each class must include $H_0$ as a special case, thus the natural role of the noise-only hypothesis. In this implementation it is useful that $H_0$ represent the condition that X be samples of iid Gaussian noise.

While the class-specific architecture is not new, this invention is the first to construct a class-specific classifier that is equivalent to the MAP classifier. Equation (7) shows clearly how the various branches of the structure are normalized and compared in order to achieve the optimal performance of the MAP classifier. It also shows that normalization by the likelihood of the common class $H_0$ is necessary to allow the outputs to be compared fairly. Without any further knowledge about the class likelihood functions, it represents the architecture with the smallest possible feature dimension that is still equivalent to the optimum Bayesian classifier.

While equation (7) requires very specific conditions to hold, specifically the sufficiency of the feature sets and the existence of a common class, the invention uses approximations when appropriate. The sufficiency of the various statistics can be relaxed somewhat, and approximations to the various likelihood functions can be made, but the likelihood functions under $H_0$ cannot be approximated without careful attention to the tails. In practice, X may vary significantly from $H_0$, especially at high signal to noise ratio (SNR). Thus, it is necessary in many cases to use exact analytic expressions for $p(z_j|H_0)$. This may seem to be an overly restrictive requirement at first. But, in most cases solutions can be found, especially if $H_0$ is chosen as iid Gaussian noise.

For real-world problems, the sufficiency of features can never be established; however, sufficiency is not really required in practice. Sufficiency is required to establish the exact relationship of the class-specific classifier to the MAP classifier. If sufficiency is approximated, so is this relationship. Compare the class-specific approach with the full-dimensional approach. With the class-specific approach, if the feature dimensions are low, one can have a good PDF approximation of approximate sufficient statistics. However, in the full-dimensional approach, one has the choice of a very poor PDF estimate of the full feature set, or a good PDF estimate of a sorely inadequate feature set.

Figure 2:
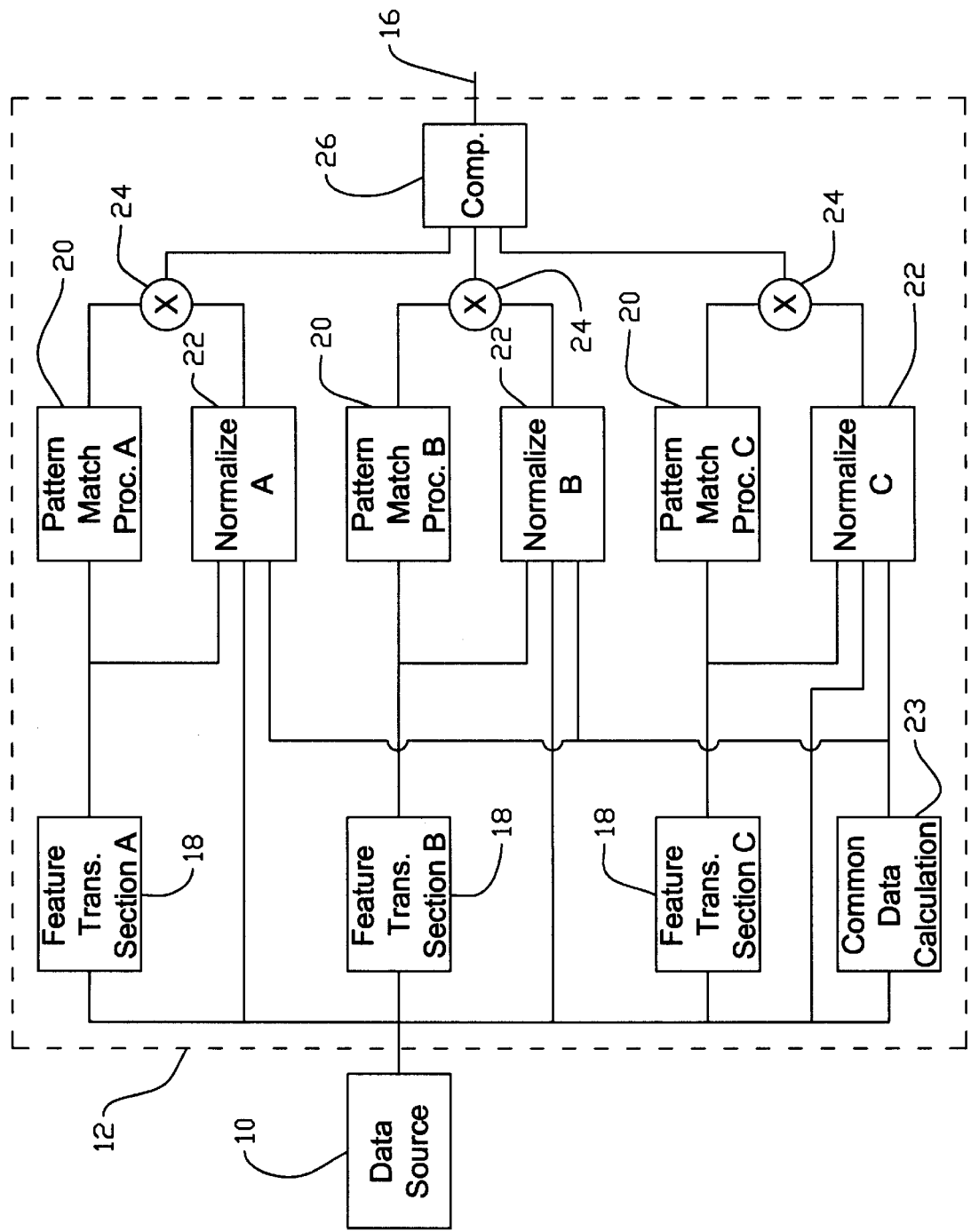
FIG. 2 is a block diagram of the class specific classifier taught by the current invention.

The current invention is shown in FIG. 2. This implementation is shown for three data classes A, B, and C; however, any number of classes may be accommodated by this system. A data source 10 supplies a raw data sample X to the processor 12 at a processor input 14. It is assumed that the data source can be type A, B, or C, but the identity is not known. Processor output 16 is a decision concerning the identity of the data source, i.e. A, B, or C. The processor 12 contains one feature transformation section 18 for each possible data class. These sections 18 are joined to receive the raw data X at processor input 14. Each feature transformation section 18 produces a feature set for its respective class. Thus the feature transformation section 18 for class A produces a feature set identified as $Z_A$, and similar feature sets $Z_B$ and $Z_C$ are produced by the respective feature transformation sections for classes B and C. The processor 12 further contains pattern match processors 20 with each pattern match processor joined to a transformation section 18 for receiving a feature set associated with one class. The pattern match processors 20 approximate the likelihood functions of the feature sets for data sampled from the corresponding data class. The likelihood function is also known in the art as the probability density function. In mathematical notation, the pattern match processors are approximations of $p(Z_A|A)$, $p(Z_B|B)$, and $p(Z_C|C)$. These likelihood functions may be approximated from a training data set by any probability density function estimation technique such as Guassian mixtures. The output of the pattern match processors 20 are highest when the input feature set, $Z_j$, is similar to or "matches" the typical values of the training set. Because the pattern match processors 20 are operating on different feature sets, the outputs cannot be directly compared to arrive at a decision without normalization. Normalization processors 22 process the feature set, $Z_j$, and approximate the inverse of the likelihood function for the corresponding feature set when the data is drawn from a special common data class called $H_0$ to be described later. The common data class $H_0$ can be calculated independently in a common data processor 23 which is joined to each normalization processor 22. Preferably the common data class $H_0$ can be calculated within each normalization processor 22 before receiving data from the data source 10. In mathematical notation, the normalization processors 22 give $1/p(Z_A|H_0)$, $1/p(Z_B|H_0)$, and $1/p(Z_C|H_0)$. In an additional embodiment, a constant may be applied to the numerator of the normalization, such as to approximate prior probabilities $p(A)$, $p(B)$, and $p(C)$. The output of the normalization processors 22 are passed to a multiplier 24 which multiplies this output with the output of the pattern match processors 20. The result of the multiplication 24 is processed by a comparison 26 jointed to the processor 12 output 16. The output 16 is the identity of the data class that has the highest output from the multiplier 24.

The common data class, $H_0$, is a special data class that is a subset of each of the other data classes. It usually is identified with the absence of any signal leaving only noise which is termed the "noise-only condition". Because signals such as those of types A, B, C, having zero amplitude are all the same, the common data class can be a member of each data class. This assumes that the defined signal types are broad enough to allow the existence of zero-amplitude signals.

The feature sets ($Z_A$ through $Z_C$ in the embodiment shown) are approximate or exact sufficient statistics if they are sufficient for statistical test between the corresponding data class and the common data class $H_0$. For example, feature set $Z_A$ contains all the information contained in the raw data relating to the decision between class A and class $H_0$.

The implementation of the normalization processors 22 often requires careful attention to tail behavior. Thus, even for examples of feature vectors $Z_j$ that are very different from samples that would have been produced if the raw data was under $H_0$ such that the normalization processor 22 denominators approach zero and the output of the normalization processors 22 approach infinity, the multiplication 24 must produce an accurate answer. This is possible by representing all quantities in the logarithm domain and implementing the multiplier 24 by an addition of logarithms. It is often necessary to obtain exact mathematical formulas for the denominator functions by deriving them analytically. This is made easier if the common class $H_0$ has a simple structure such as independent Gaussian noise.

The main advantage of the class specific classifier is that the individual feature sets ($Z_A$ through $Z_C$) can be smaller than would be necessary if a common feature set was used, such as in the standard classifier. The smaller size means that the pattern match processors 20 may be accurately trained with fewer training data samples or given the same number of training samples, the class specific classifier has better pattern match accuracy and thus better performance.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed is:

1. A class specific classifier for classifying data received from a data source comprising:

at least two feature transformation sections wherein each feature transformation section is associated with a data class, each said feature transformation section having a feature transformation section input joined to receive data from said data source, calculating a feature set for the data class associated with that feature transformation section and having a feature transformation section output;

at least two pattern matching processors, each pattern matching processor being joined to one said feature transformation section output and receiving a feature set for the associated data class, each pattern matching processor having a pattern matching processor output and calculating a likelihood function for the associated data class and providing that likelihood function to the pattern matching processor output;

a common data class calculator calculating a data set representing data that is common to all data classes, said common data class calculator having a common data class calculator output and providing said common data set to said common data class calculator output;

at least two normalization processors, each normalization processor being joined to one said feature transformation section output for receiving a feature set for the associated data class, said common data class calculator output for receiving a common data set and said data source for receiving data, each normalization processor having a normalization processor output, approximating an inverse likelihood function for the associated feature set using the associated class data, the common data set and the associated feature set and providing said approximated inverse likelihood function to said normalization processor output;

at least two multipliers, each multiplier being joined to one pattern match processor output and one normalization processor output for receiving a likelihood function for the associated data class and an inverse likelihood function using the common data feature set, each multiplier multiplying said likelihood function and said inverse likelihood function for the associated data class and providing said result to a multiplier output; and a comparator joined to each multiplier output for receiving said result for said associated data class, said comparator having a comparator output and providing a signal to the comparator output indicating that the data received is of the data class associated with the multiplier output result having the highest value.

2. The device of claim 1 wherein:

each said pattern match processor output provides said likelihood function for the associated data class in logarithmic form;

each said normalization processor output provides said inverse likelihood function in logarithmic form; and each multiplier calculates said result by adding said logarithmic likelihood function and said logarithmic inverse likelihood function.

3. The device of claim 1 wherein each said normalization processor applies a constant calculated from the associated data class to said inverse likelihood function for approximating prior probabilities.

4. The device of claim 1 wherein each said normalization processor includes said common data processor therein.

5. The device of claim 1 wherein said common data class calculator calculates a data set representing the noise only class of data.

6. The device of claim 5 wherein the noise only class of data is represented by independent Gaussian noise.

7. The device of claim 1 wherein each said pattern matching processor approximates the likelihood function from known data by a probability density function estimation technique.

8. The device of claim 7 wherein the probability density function estimation technique is Gaussian mixtures.

9. A method for classifying a data signal comprising the steps of:

receiving data with an unknown data class;

calculating a possible feature set for the received data for each possible data class;

calculating a likelihood function for each said possible feature set using a known feature set for each possible data class;

calculating a common data set representing data that is common to all possible data classes;

calculating an inverse likelihood function for each possible data class utilizing the calculated common data set, the received data, and the possible feature set for the possible data class;

normalizing each said calculated likelihood function by multiplying each said calculated likelihood function by each said inverse likelihood function for the same possible data class;

comparing each normalized likelihood function for each possible data class against the other normalized likelihood functions; and providing a result indicating the possible data class for the normalized likelihood function having the greatest value.

10. The method of claim 9 further comprising the steps of:

calculating a constant approximating probabilities for data having a known class for each possible data class; and multiplying said calculated inverse likelihood function for each possible class by said calculated constant for the same possible class.

11. The method of claim 9 wherein said calculated common data set represents the noise only data class.

12. The method of claim 11 wherein the calculated common data set is calculated using independent Gaussian noise.

13. The method of claim 9 wherein the step of calculating a likelihood function is approximated from data having a known class by a probability density function estimating technique.

14. The method of claim 13 wherein the probability density function estimating technique is Gaussian mixtures.

* * * * *